(12) United States Patent
Han et al.

(10) Patent No.: US 6,513,636 B2
(45) Date of Patent: Feb. 4, 2003

(54) CLUTCH CONSTRUCTION FOR AUTOMOBILE TRANSMISSION

(75) Inventors: Ki Jung Han, Fuji (JP); Heonil Park, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/772,467

(22) Filed: Jan. 30, 2001

(65) Prior Publication Data

US 2001/0017251 A1 Aug. 30, 2001

(30) Foreign Application Priority Data

Jan. 31, 2000 (JP) ........................................ 2000-022310

(51) Int. Cl.[7] .............................................. F16H 57/00
(52) U.S. Cl. ................................ 192/85 AA; 192/106 F
(58) Field of Search ........................... 192/85 AA, 70.2, 192/109 F, 106 F, 85 R, 91 A

(56) References Cited

U.S. PATENT DOCUMENTS 5,172,799 A * 12/1992 Iijima et al. ............. 192/106 F
5,755,314 A * 5/1998 Kanda et al. .......... 192/113.35
5,992,597 A * 11/1999 Nagai et al. ............. 192/109 F
6,039,160 A * 3/2000 Joppeck ..................... 192/52.5

* cited by examiner

Primary Examiner—Saul Rodriguez
(74) Attorney, Agent, or Firm—Rossi & Associates

(57) ABSTRACT

A clutch drum is constituted by a two-piece construction of an inner drum and outer drum. The inner drum is provided with a step at the corner from its disc part to its outer tube, and the vertical wall of the outer drum is butt welded to the step. The inner drum serves as the cylinder for a piston, enabling its inner circumferential surface up to its tip to be utilized as a piston sliding surface of sufficient length even though the outer tube is short. An extension of the piston having a part for applying pressure to the friction plates is offset towards the vertical wall of the outer drum after crossing the tip of the outer tube, thereby further shortening the length of the clutch as a whole in the axial direction while guaranteeing the stroke gap between itself and the clutch hub.

4 Claims, 2 Drawing Sheets

CLUTCH CONSTRUCTION FOR AUTOMOBILE TRANSMISSION

BACKGROUND OF THE INVENTION

1. Field of the Invention

The present invention relates to a clutch construction in an automatic transmission for a vehicle.

2. Description of the Prior Art

In an automatic transmission mounted in an automobile etc, a planetary gear mechanism and engaging elements such as clutches are combined, and a plurality of gear positions are realized by a combination of engaging/disengaging of engaging elements.

Such an automatic transmission clutch construction is disclosed in for example Laid-open Japanese Patent publication number 6-185613.

In this clutch 80, as shown in FIG. 2, a clutch drum 81 is a one-piece molding produced by press forming, and a spline 83 is formed on a tubular outer drum 82 thereof.

A plurality of friction plates 93 that respectively mesh with a spline 91 that is formed on a clutch hub 90 arranged facing the inside of the outer drum 82 and the aforesaid spline 83 are arranged alternately.

Within the clutch drum 81, there is provided a piston 88 for applying pressure to the friction plates 93. A pressure chamber 89 for driving this piston 88 is formed between this piston and the clutch drum 81. In order to achieve an oil-tight stroke of the piston 88, the outer circumferential surface of an inner tube 84 of the clutch drum 81 is made to serve as a sliding surface on the radially inwards side of the piston and the inner circumferential wall of a projection 86 formed on a vertical wall 85 is made to serve as a sliding surface on the radially outwards side of the piston.

However, the projection 86 forming the aforesaid piston sliding surface projects to the outside from the vertical wall 85 rather than to the interior of the clutch drum that accommodates the friction plates 93 and the clutch hub 90. Furthermore, since the entire clutch drum 81 is constituted as a one-piece press molding, radiussing (R) is necessarily required at the corner portion in the cross-section, so the length dimension S of the projection 86 must take into account this radiussing in order to ensure the prescribed piston stroke.

Therefore the overall length of clutch drum 81 in the axial direction has to be large.

SUMMARY OF THE INVENTION

An object of the present invention is therefore to provide a clutch construction for an automatic transmission wherein the surroundings of the piston of clutch drum are made compact, enabling the axial length to be shortened.

To this end, the clutch construction according to the present invention comprises:

a clutch drum composed of an inner drum comprising a hub part, disc part and outer tube, and an outer drum having a drum and a vertical wall joined to the radially outside of the inner drum; a clutch hub arranged facing the outer drum within the clutch drum; a plurality of friction plates that alternately engage with the outer drum and the clutch hub; and a piston for applying pressure to the friction plates; wherein said inner drum constitutes a cylinder that accommodates the piston and the outer circumferential surface of the hub part and inner circumferential surface of the outer tube form sliding surfaces for the piston.

Since the outer tube of the inner drum is formed in a straight line in the axial direction as far as its tip, its inner circumferential surface as far as its tip can be utilized as a piston sliding surface of sufficient length even though the outer tube is short. In this way, the benefit is achieved that the necessary sliding surface length can be ensured even though the length of the clutch drum in the axial direction is shortened.

By providing the inner drum with a step at the corner from the disc part to the outer tube, the vertical wall of the outer drum being butt welded to this step, joining of the inner drum and outer drum can be achieved with high precision in the axial direction and radial direction.

Furthermore, by arranging the friction plates outside of the outer tube and the piston having an extension that extends outwards beyond the outer tube and comprising a portion that applies pressure to the friction plates at its radially outer end, this extension being offset towards the vertical wall of the outer drum after crossing the tip of the outer tube, the length of the clutch as a whole in the axial direction can be further shortened whilst guaranteeing a sufficient stroke gap with respect to the clutch hub.

A centrifugal canceling piston may be further provided on the outer circumferential surface of the hub part of the inner drum, this centrifugal canceling piston having an external diameter corresponding to the inner circumferential surface of the outer tube. The pressure-receiving area of each piston can thereby be equalized simply by altering the diameter of the outer tube; thus piston control with excellent balance can be obtained.

BRIEF DESCRIPTION OF THE DRAWINGS

A preferred embodiment of the present invention will be described in detail on the basis, of the following figures, wherein.

DETAILED DESCRIPTION OF THE PREFERRED EMBODIMENTS

Figure 1:
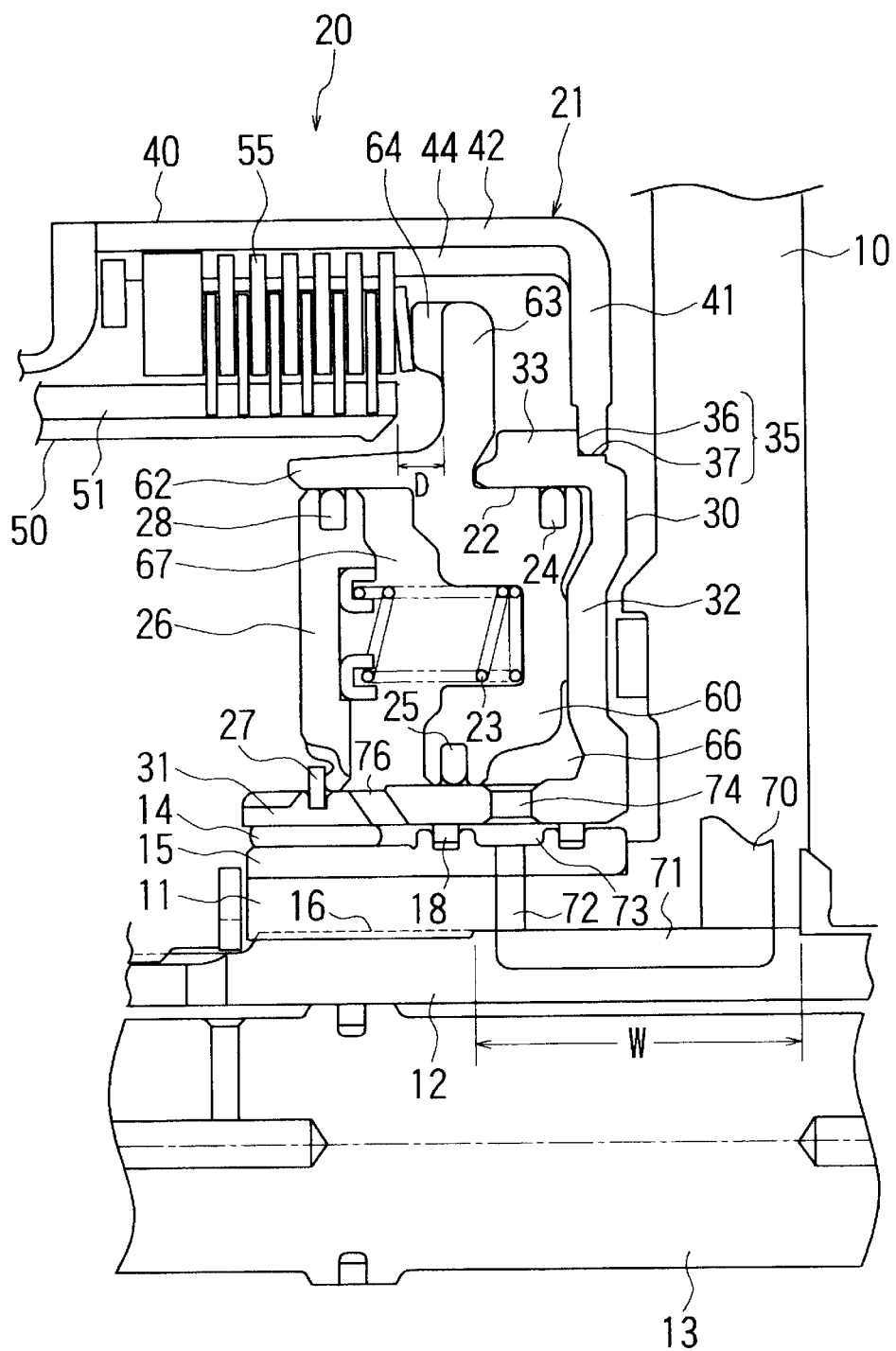
FIG. 1 is a cross-sectional view illustrating an embodiment of the present invention.
Figure 2:
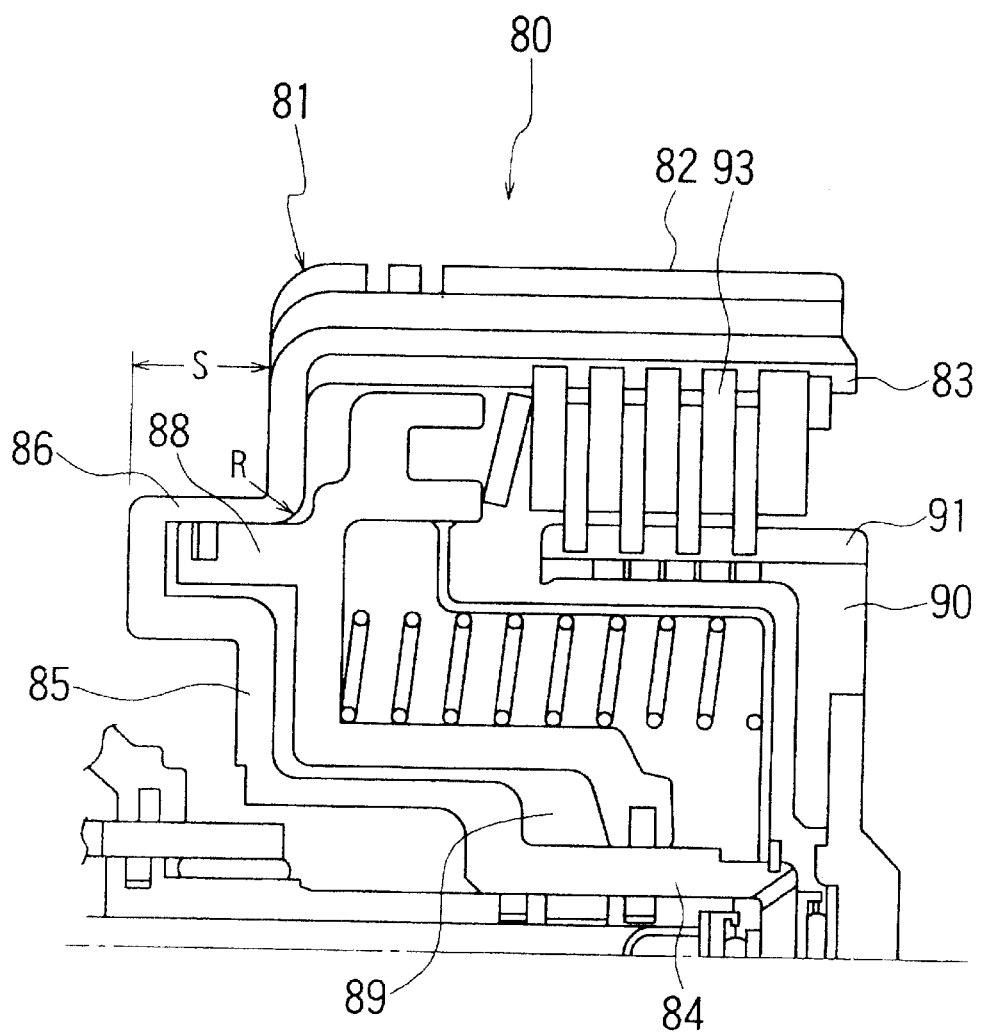
FIG. 2 is a view illustrating a prior art example.

FIG. 1 is a cross-sectional view showing an embodiment.

A projecting tube part 11 extends from a fixed side partition 10 of a transmission case, and a stator shaft 12 that supports input shaft 13 is fixed, passing through the projecting tube part 11.

A clutch 20 is arranged on the projecting tube part 11 and a clutch drum 21 is rotatably supported by means of a bush 14 and a sleeve 15 fixed to the projecting tube part 11.

The clutch drum 21 of the clutch 20 comprises respectively press-formed inner drum 30 and outer drum 40.

The inner drum 30 comprises an inner tubular hub part 31, a disc part 32 extending outwards from the hub part 31, and an outer tube 33 connected to the disc part 32.

The outer drum 40 comprises a vertical wall 41 joined to a corner part of the outer tube 33 and the disc part 32 of the inner drum 32, and extending further outwards, and a drum part 42 connected to the vertical wall 41.

A step 35 of cross-sectional shape having a perpendicular vertical surface 36 and a horizontal bottom surface 37 is formed at the corner part from the disc part 32 to the outer tube 33 of the inner drum 30 by cutting away the outer tube 33 which is thicker than the disc part 32; the radially inner edge of vertical wall 41 of the outer drum 40 is butt welded to the step 35. Thus the vertical wall 41 of the outer drum 40 appears to extend outwards from the disc part 32 of the inner drum 30.

A clutch hub 50 is arranged facing the inside of the drum part 42, and a plurality of friction plates 55 mesh alternately with a spline 44 formed on the inner circumference of the drum part 42 and a spline 51 formed on the outer circumference of the clutch hub 50.

The internal diameter of the clutch hub 50 is substantially identical with the external diameter of the outer tube 33 of the inner drum 30.

On the inner drum 30 of the clutch drum 21, a ring-shaped cylinder 22 is formed between the outer circumferential surface of the hub part 31 and the inner circumferential surface of the outer tube 33; a piston 60 is thus capable of applying pressure to the friction plates 55 by stroking in the axial direction.

Respective sealing rings 24 and 25 are provided on the sliding surfaces of the piston 60 with the cylinder 22.

Also, a spring seat 26 is mounted by a snap ring 27 at the outer circumference of the hub part 31, and a return spring 23 is provided between the piston 60 and the spring seat 26.

On the piston 60 on the side of the spring seat 26, there extends a flange 62 having an internal diameter subtantially the same as the inner circumferential surface of the outer tube 33 so that the radially outer surface of the spring seat 26 and the radially inner surface of the flange 62 slide against each other when the piston 60 strokes. A sealing ring 28 is provided on the radially outer surface of the spring seat 26. The spring seat 26 thereby forms a centrifugal canceling piston with respect to the piston 60.

The piston 60 is further provided with an extension 63 extending from a location near the tip of the outer tube 33 in the radially outwards direction, in a condition in which it is seated on the disc part 32 of the inner drum 30. The extension 63 is offset towards the vertical wall 41 of the outer drum 40 after cutting across the tip of the outer tube 33, forming a prescribed gap D between itself and the edge of the clutch hub 50. A pressure applying part 64 extends from the radially outer end of the extension 63 towards the friction plates 55.

The upper corner in the drawing at the tip of the outer tube 33 is cut away to avoid interference with the offset extension 63. The inner circumferential surface of the outer tube 33 serves as cylinder 22 and constitutes a sliding surface of the piston 60 as far as its tip; a minimum degree of chamfering is applied to the bottom corner of the tip.

The stator shaft 12 is fixed to the projecting tube part 11 by meshing of serrations 16 in its leading-end half and press-fitting of the root-side half of the fixed-side partition 10 of the projecting tube part 11. In the drawing, W indicates (the range of) the press-fitting portion.

In the hub part 31 of the clutch drum 21, there are provided oil holes 74 that open into an oil pressure chamber 66 formed between the cylinder 22 and the piston 60 and oil holes 76 that open into a return pressure chamber 67 between the piston 60 and the spring seat 26.

In the sleeve 15 that supports the hub part 31, there is formed a ring groove 73 matching the oil holes 74; sealing rings 18 are arranged on both sides thereof in the axial direction.

Also, the oil holes 76 of the hub part 31 connect the return pressure chamber 67 with the space between the sealing ring 18 and the bush 14.

An oil path 72 opening into the ring groove 73 is provided passing through the sleeve 15 and the projecting tube part 11 in the direction at right angles to the axis, and an oil path 70 formed in the fixed-side partition 10 and the aforesaid oil path 72 are connected by an oil groove 71 formed in the axial direction at the circumferential surface of the press-fitting portion W of the stator shaft 12. Oil can thereby be supplied from the oil path 70 of the fixed-side partition 10 into the oil pressure chamber 66 through the oil groove 71 of the stator shaft 12, the oil path 72 and the oil holes 74.

Likewise, an oil groove forming an oil supply path from the oil paths, not shown, of the fixed-side partition 10 to the return pressure chamber 67 through the oil paths 76 is provided on the stator shaft 12 at the press-fitting portion W.

As described above, in this embodiment, the clutch drum 21 is constituted by two pieces, namely, the outer drum 40 and the inner drum 30 serving as the cylinder 22 that accommodates the piston 60 by the hub part 31 and the outer tube 33, and the extension 63 of the piston 60 for application of pressure to the friction plates is offset in the direction away from the clutch hub 50 with a prescribed gap. As a result, compared with a construction in which press forming is effected in a single piece, a sufficient stroke allowance for piston 60 can be obtained even with the short outer tube 33, and a distance such as to enable a sufficient stroke of the piston 60 can likewise be obtained by gap D even though the tip of the outer tube 33 and the clutch hub 50 are positioned close to each other in the axial direction.

Also, since the clutch hub 50 can be positioned deep within the clutch drum 21, the size in the axial direction of the clutch as a whole can be made small.

Also, since the step 35 is formed at the corner from the disc part 32 to the outer tube 33 of the inner drum 30 at the location where the inner drum 30 and the outer drum 40 are joined, and the radially inner edge of the vertical wall 41 of the outer drum is butt welded thereto, joining of the two drums 30 and 40 can be achieved with high precision in the axial direction and radial direction.

What is claimed is:

1. A clutch construction for an automatic transmission, comprising:

a clutch drum having an inner drum and an outer drum, said inner drum having a hub part, a disc part, and an outer tube, and said outer drum having a drum and a vertical wall, said vertical wall being joined to a radial outer portion of said inner drum;

a clutch hub arranged facing said outer drum within said clutch drum;

a plurality of friction plates that alternately engage with said outer drum and said clutch hub; and a piston for applying pressure to said friction plates, wherein said inner drum forms a cylinder that accommodates said piston and an outer circumferential surface of said hub part and an inner circumferential surface of said outer tube form sliding surfaces for said piston.

2. The clutch construction for an automatic transmission according to claim 1, wherein said inner drum is provided with a step portion at a corner portion of said disc part and said outer tube, and said vertical wall of said outer drum is butt welded to said step-portion.

3. A clutch construction for an automatic transmission, comprising:

a clutch drum having an inner drum and an outer drum, said inner drum having a hub part, a disc part, and an outer tube, and said outer drum having a drum and a vertical wall, said vertical wall being joined to said inner drum at a radial outer portion of said inner drum;

a clutch hub arranged facing said outer drum within said clutch drum;

a plurality of friction plates that alternately engage with said outer drum and said clutch hub; and a piston for applying pressure to said friction plates, wherein said inner drum forms a cylinder that accommodates said piston and an outer circumferential surface of said hub part and an inner circumferential surface of said outer tube form sliding surfaces for said piston, and wherein said friction plates are arranged outside of said outer tube, and said piston has an extension that extends outwardly beyond said outer tube and has a portion that applies pressure to said friction plates at a radial outer end thereof, said extension being offset toward said vertical wall of said outer drum after crossing a tip of said outer tube.

4. The clutch construction for an automatic transmission according to claim 1, 2 or 3, wherein a centrifugal canceling piston is further provided on the outer circumferential surface of the hub part of said inner drum, said centrifugal canceling piston having an external diameter corresponding to the inner circumferential surface of said outer tube.

* * * * *